United States Patent
Matsuda

(10) Patent No.: US 12,062,979 B2
(45) Date of Patent: Aug. 13, 2024

(54) DRIVE DEVICE

(71) Applicant: DENSO CORPORATION, Kariya (JP)

(72) Inventor: Kunihiko Matsuda, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/059,909

(22) Filed: Nov. 29, 2022

(65) Prior Publication Data

US 2023/0097198 A1    Mar. 30, 2023

Related U.S. Application Data

(63) Continuation of application No. PCT/JP2021/021174, filed on Jun. 3, 2021.

(30) Foreign Application Priority Data

Jun. 4, 2020 (JP) ................. 2020-097752

(51) Int. Cl.
*H02M 3/07* (2006.01)
*H02M 3/158* (2006.01)

(52) U.S. Cl.
CPC ......... *H02M 3/076* (2021.05); *H02M 3/1582* (2013.01)

(58) Field of Classification Search
None
See application file for complete search history.

(56) References Cited

U.S. PATENT DOCUMENTS

| | | | |
|---|---|---|---|
| 9,484,758 B2 * | 11/2016 | Chen | H02M 3/1588 |
| 9,806,607 B2 * | 10/2017 | Ranmuthu | H02M 1/08 |
| 10,075,098 B2 * | 9/2018 | Imura | H02M 7/5387 |
| 2018/0034384 A1 | 2/2018 | Imura | |

FOREIGN PATENT DOCUMENTS

| | | |
|---|---|---|
| JP | 2005-6467 A | 1/2005 |
| JP | 2015-89268 A | 5/2015 |

* cited by examiner

*Primary Examiner* — Jeffrey S Zweizig
(74) *Attorney, Agent, or Firm* — MASCHOFF BRENNAN

(57) ABSTRACT

A drive device for driving a load includes: an inverter unit having an upper arm element and a lower arm element and converting electric power supplied to the load; and a charge pump circuit that supplies a gate voltage to the upper arm element. An output voltage of the charge pump circuit is variable according to an inverter input voltage input from an inverter input wiring to a high potential side of the inverter unit.

6 Claims, 6 Drawing Sheets

DRIVE DEVICE

CROSS REFERENCE TO RELATED APPLICATION

The present application is a continuation application of International Patent Application No. PCT/JP2021/021174 filed on Jun. 3, 2021, which designated the U.S. and claims the benefit of priority from Japanese Patent Application No. 2020-097752 filed on Jun. 4, 2020. The entire disclosures of all of the above applications are incorporated herein by reference.

TECHNICAL FIELD

The present disclosure relates to a drive device.

BACKGROUND

Conventionally, a drive circuit for driving a load such as a motor is known. For example, in a conceivable technique, the booster circuit performs feedback control so that the booster voltage becomes a target value.

SUMMARY

According to an example, a drive device for driving a load may include: an inverter unit having an upper arm element and a lower arm element and converting electric power supplied to the load; and a charge pump circuit that supplies a gate voltage to the upper arm element. An output voltage of the charge pump circuit is variable according to an inverter input voltage input from an inverter input wiring to a high potential side of the inverter unit.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
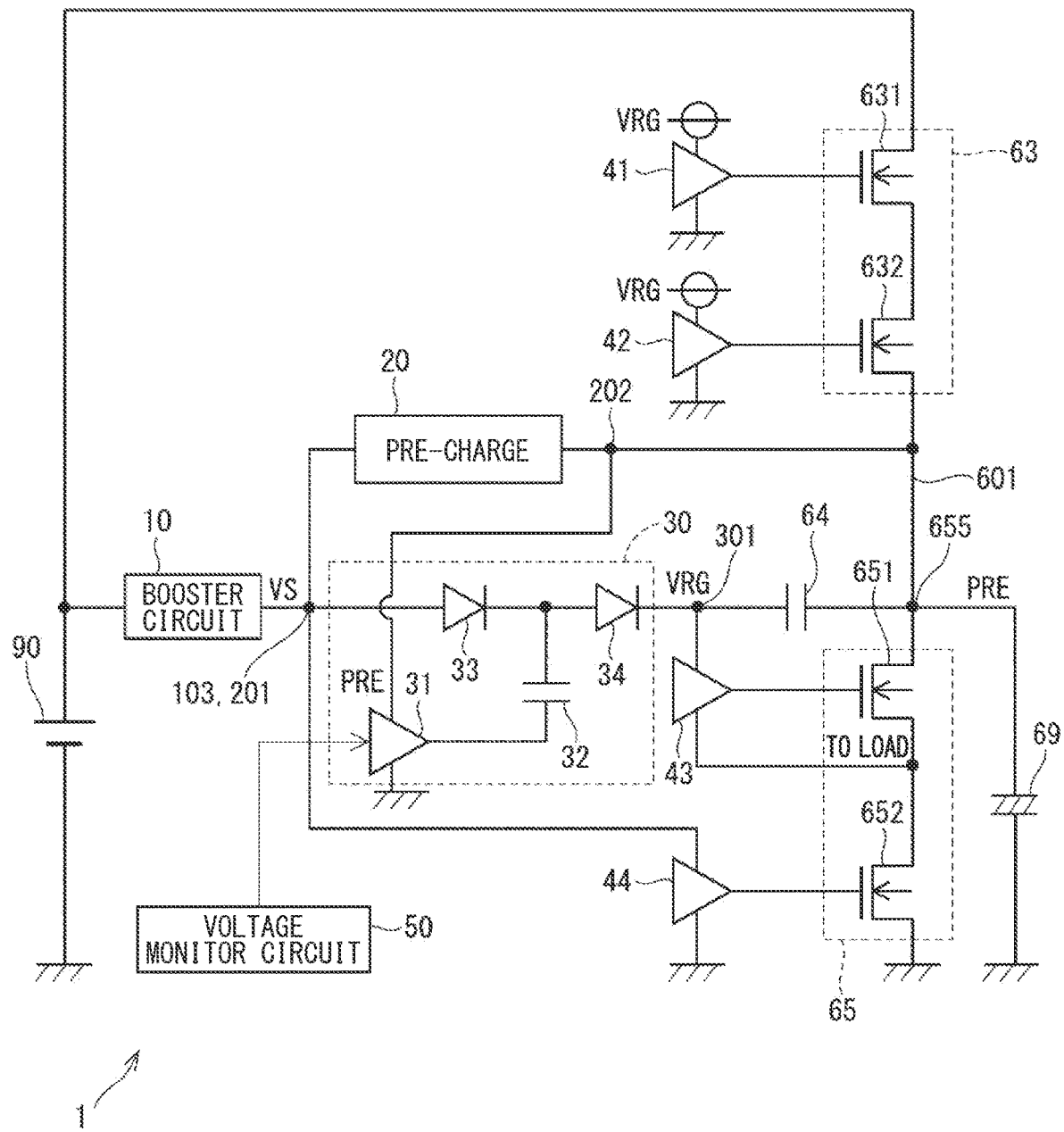
FIG. 1 is a circuit diagram showing a drive device according to a first embodiment.

When the driver power supply generation circuit is a charge pump circuit, and the voltage that can be output by constantly driving the charge pump circuit is larger than the target boost voltage, the charge pump circuit is intermittently operated to output the target voltage. When the output voltage of the charge pump circuit is supplied to the gate of the switching element, if the output voltage of the charge pump circuit and the source voltage of the switching element are different, and the source-gate voltage exceeds the withstand voltage, there is a risk that the switching element may be damaged.

Therefore, when the voltage on the source side of the switching element is reduced due to the reduction in the battery voltage, the output voltage of the charge pump circuit can be lowered by intermittently operating the charge pump circuit, and the source-gate voltage can be reduced to be the withstand voltage or less. However, depending on the difference voltage, the switching frequency in the intermittent operation of the charge pump circuit may be in the audible range, and the sound of the capacitor may occur.

The present embodiments provide a drive device capable of appropriately protecting a switching element.

The drive device of the present embodiments includes an inverter unit and a charge pump circuit. The inverter unit has an upper arm element and a lower arm element, and converts the electric power supplied to the load. The charge pump circuit supplies the gate voltage of the upper arm element. The output voltage of the charge pump circuit is variable according to the inverter input voltage input from the inverter input wiring to the high potential side of the inverter unit. Thereby, the upper arm element can be appropriately protected.

A drive device according to the present disclosure will be described below with reference to the drawings. In the following plural embodiments, substantially same structural configurations are designated with the same reference numerals thereby to simplify the description.

First Embodiment

A first embodiment will be described based on FIGS. 1 to 5. The drive device 1 includes a booster circuit 10, a pre-charge circuit 20, a charge pump circuit 30, gate drive circuits 41 to 44, a voltage monitor circuit 50, an inverter unit 65, and the like, and inverts the electric power supplied from the battery 90 using the inverter unit 65 to drive a load (not shown). The load is, for example, a motor and is applied to an electric power steering device.

The inverter unit 65 has an upper arm element 651 and a lower arm element 652. The upper arm element 651 and the lower arm element 652 are, for example, MOSFETs, alternatively, IGBTs, thyristors, and the like may be used. The same feature applies to the relay elements 631 and 632. In FIG. 1, one set of upper arm element 651 and lower arm element 652 is shown, alternatively, when the load connected to the inverter unit 65 is a three-phase motor, three sets of the upper arm elements 651 and the lower arm elements 652 may be connected in parallel.

The power supply relay unit 63 is provided between the battery 90 and the inverter unit 65, and has relay elements 631 and 632. The relay elements 631 and 632 are, for example, MOSFETs, and are connected in series so that the directions of the parasitic diodes are opposite to each other. A smoothing capacitor 69 is connected in parallel to the inverter unit 65. The wiring connecting the battery 90 and the inverter unit 65 is referred to as an inverter input wiring 601. In the present embodiment, the pre-charge circuit 20 is connected to the inverter input wiring 601, and the smoothing capacitor 69 can be pre-charged via the pre-charge circuit 20 under a off state of the power supply relay unit 63. Further, the voltage of the inverter input wiring 601 is the pre-charge voltage PRE.

Figure 2:
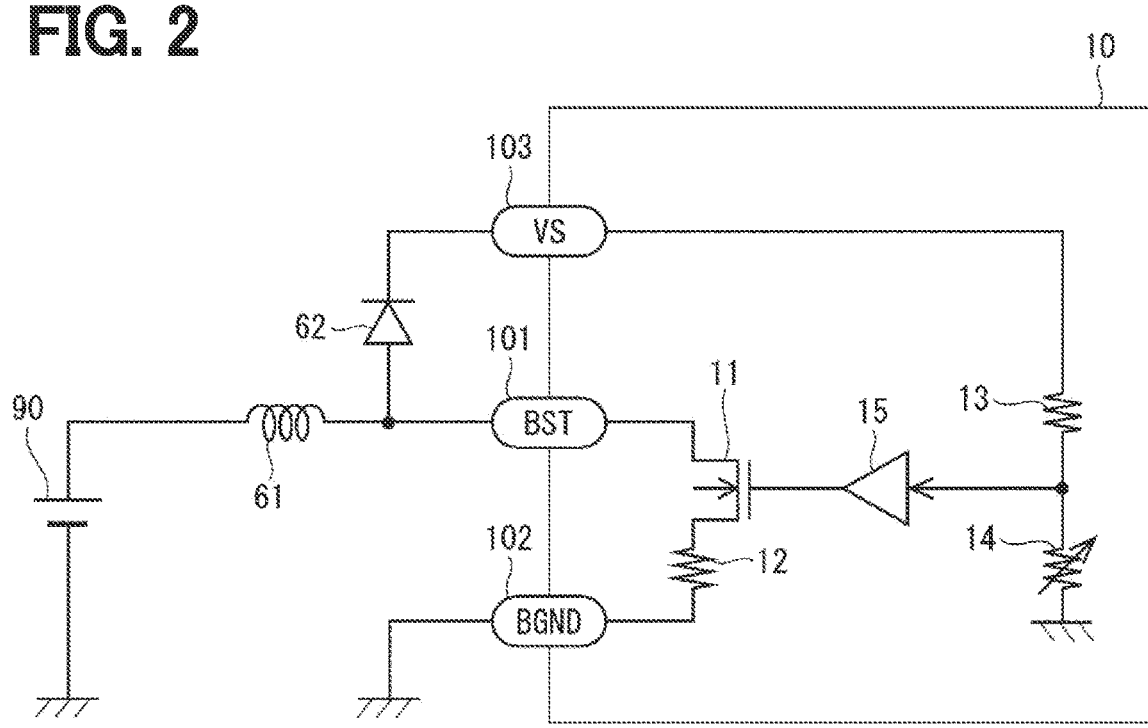
FIG. 2 is a circuit diagram showing a booster circuit according to the first embodiment.

As shown in FIG. 2, the booster circuit 10 is a chopper type circuit and includes a switching element 11, a resistor 12, a gate resistor 13, a variable resistor 14, and a gate drive unit 15. The boost voltage VS of the booster circuit 10 is supplied to the pre-charge circuit 20 and the charge pump circuit 30. The booster circuit 10 always functions to maintain the booster voltage VS at the predetermined value Vx (for example, 16 [V]) while the start switch (hereinafter, appropriately referred to as "IG") such as the ignition switch of the vehicle is turned on.

The drain of the switching element 11 is connected to the battery 90 via the input terminal 101 and the coil 61. The source of the switching element 11 is connected to the ground via the resistor 12 and the ground terminal 102. The high potential side of the resistor 13 is connected between the coil 61 and the input terminal 101 via the output terminal 103 and the diode 62. The diode 62 is connected so that the anode is disposed on the midpoint side between the coil 61 and the input terminal 101 and the cathode is disposed on the output terminal 103 side. The low potential side of the resistor 13 is connected to the ground via the variable resistor 14. A gate voltage is supplied to the gate of the switching element 11 from between the resistors 13 and 14 via the gate drive unit 15.

Figure 3:
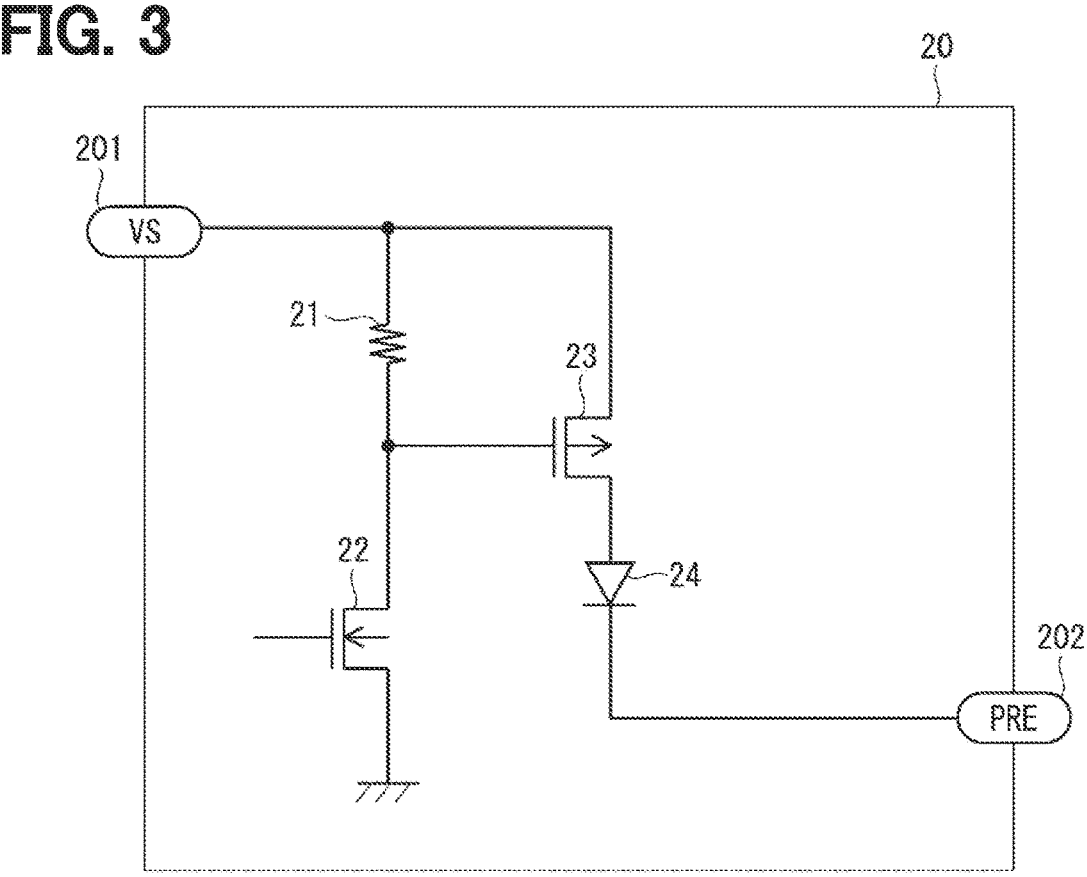
FIG. 3 is a circuit diagram showing a pre-charge circuit according to the first embodiment.

As shown in FIG. 3, the pre-charge circuit 20 has a resistor 21, switching elements 22, 23, and a diode 24, is turned on after the IG is turned on, and is turned off after the power supply relay unit 63 is turned on. A boost voltage VS is supplied from the terminal 201 to the drain of the switching element 22 via the resistor 21. The source of the switching element 22 is connected to ground.

The gate of the switching element 23 is connected between the resistor 21 and the switching element 22. A boost voltage VS is supplied from the terminal 201 to the source of the switching element 23. The drain of the switching element 23 is connected to the terminal 202 via the diode 24. The diode 24 is connected so that the anode is disposed on the switching element 23 side and the cathode is disposed on the terminal 202 side. The voltage of the terminal 202 is defined as the pre-charge voltage PRE. By turning on the switching element 23, the smoothing capacitor 69 can be charged under an off state of the power supply relay unit 63. The booster circuit 10 and the pre-charge circuit 20 may have different circuit configurations as long as the booster function and the pre-charge function can be realized.

Figure 4:
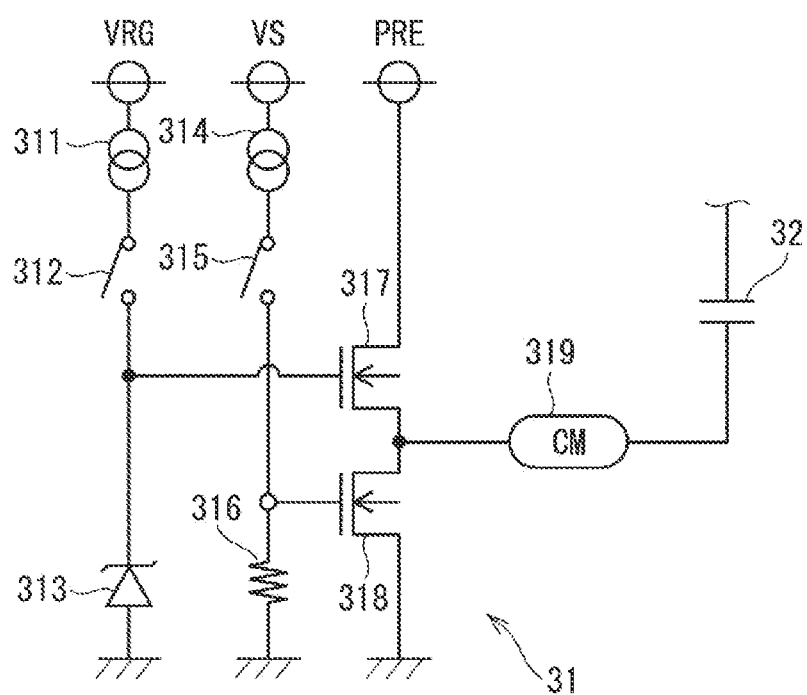
FIG. 4 is a circuit diagram showing a charge pump driver circuit according to the first embodiment.

As shown in FIG. 1, the charge pump circuit 30 includes a charge pump driver circuit 31, a capacitor 32, diodes 33, 34, and the like. As shown in FIG. 4, the charge pump driver circuit 31 includes constant current supplies 311 and 314, switches 312 and 315, a Zener diode 313 for preventing damage of the switching element 317, a resistor 316, and switching elements 317 and 318.

The charge pump voltage VRG is input to the constant current supply 311. The switch 312 is supplied with a current from the constant current supply 311 and is connected to the ground via the Zener diode 313. A boost voltage VS is input to the constant current supply 314. The switch 315 is supplied with a current from the constant current supply 314 and is connected to the ground via the resistor 316.

The switching elements 317 and 318 are connected in series. A pre-charge voltage PRE is input to the drain of the switching element 317 on the high potential side, and the source is connected to the drain of the switching element 318. The source of the switching element 318 is connected to the ground. The gate of the switching element 317 is connected between the switch 312 and the Zener diode 313, and the gate of the switching element 318 is connected between the switch 315 and the resistor 316.

When the switching element 317 is turned on, the switch 312 is turned on and the switch 315 is turned off. When the switching element 318 is turned on, the switch 312 is turned off and the switch 315 is turned on. The midpoint of the switching elements 317 and 318 is connected to the driver output terminal 319.

As shown in FIGS. 1 and 4, the capacitor 32 is connected to the driver output terminal 319 and the midpoint of the diodes 33 and 34. The diodes 33 and 34 are connected in series so that the anode is disposed on the booster circuit 10 side and the cathode is disposed on the gate drive circuit 41 to 43 side. The output terminal 301 of the charge pump circuit 30 is connected to the gate drive circuits 41 to 43. In FIG. 1, the connection line between the output terminal 301 and the gate drive circuits 41 and 42 is omitted in order to avoid complication. Further, the output terminal 301 is connected to the inverter input terminal 655 via the capacitor 64.

In the present embodiment, the pre-charge voltage PRE is supplied to the charge pump driver circuit 31, and the driver power supply provides the pre-charge voltage PRE. Therefore, the charge pump voltage VRG, which is the output voltage of the charge pump circuit 30, is expressed by the equation (1). 2Vf in the equation (1) is a voltage drop of the diodes 33 and 34.

$$VRG=(VS-2Vf)+PRE \tag{1}$$

The gate drive circuits 41 and 42 are connected to the gates of the relay elements 631 and 632, the gate drive circuit 43 is connected to the gate of the upper arm element 651, and the gate drive circuit 44 is connected to the gate of the lower arm element 652. The charge pump voltage VRG is supplied to the gate drive circuits 41 to 43, and the boost voltage VS is supplied to the gate drive circuits 44.

The voltage monitor circuit 50 monitors the difference voltage $\Delta V$, which is the difference between the charge pump voltage VRG and the pre-charge voltage PRE (see equation (2)). The difference voltage $\Delta V$ is substantially equal to the gate-source voltage Vgs of the upper arm element 651. Therefore, as the difference voltage $\Delta V$ increases, the gate-source voltage Vgs of the upper arm element 651 also increases. The difference voltage $\Delta V$ is monitored so that the gate-source voltage Vgs of the upper arm element 651 does not exceed the withstand voltage, and when the difference voltage $\Delta V$ exceeds the stop determination threshold value, the charge pump circuit 30 is stopped. Further, for example, when the difference voltage $\Delta V$ exceeds the intermittent determination threshold value set to a value smaller than the stop determination threshold value due to an increase in the boost voltage VS or the like, the protection of the upper arm element 651 is prioritized over the prevention of sound noise, so that the charge pump circuit 30 is operated intermittently.

$$\Delta V=VRG-PRE \tag{2}$$

As a reference example, for example, when the voltage of the battery 90 is supplied to the charge pump driver circuit 31, the charge pump voltage VRG is obtained by the equation (3-1), and the gate-source voltage Vgs of the upper arm element 651 is obtained by the equation (3-2).

$$VRG=2VS-2Vf \tag{3-1}$$

$$Vgs=VRG-PRE=2VS-2Vf-PRE \tag{3-2}$$

In this case, when the pre-charge voltage PRE decreases, the gate-source voltage Vgs may exceed the withstand voltage of the upper arm element 651. For example, by monitoring the difference voltage ΔV and intermittently operating the charge pump driver circuit 31, the gate-source voltage Vgs can be prevented from exceeding the withstand voltage. Here, when the switching frequency of the intermittent operation is in the audible range, the sound of the capacitor 32 may be generated. Therefore, in the present embodiment, the pre-charge voltage PRE is supplied to the charge pump driver circuit 31. The gate-source voltage Vgs of this embodiment is given by the equation (4).

$$Vgs=VS-2Vf \quad (4)$$

Since the boost voltage VS of the booster circuit 10 is substantially constant at the set value Vx, the gate-source voltage Vgs is also kept substantially constant regardless of the pre-charge voltage PRE. As a result, the gate-source voltage Vgs can be set to be equal to or lower than the withstand voltage of the upper arm element 651 even when the pre-charge voltage PRE is lowered. As a result, by constantly driving the charge pump circuit 30 in the normal state, it is possible to protect the upper arm element 651 while preventing the sound noise of the pumping capacity.

Figure 5:
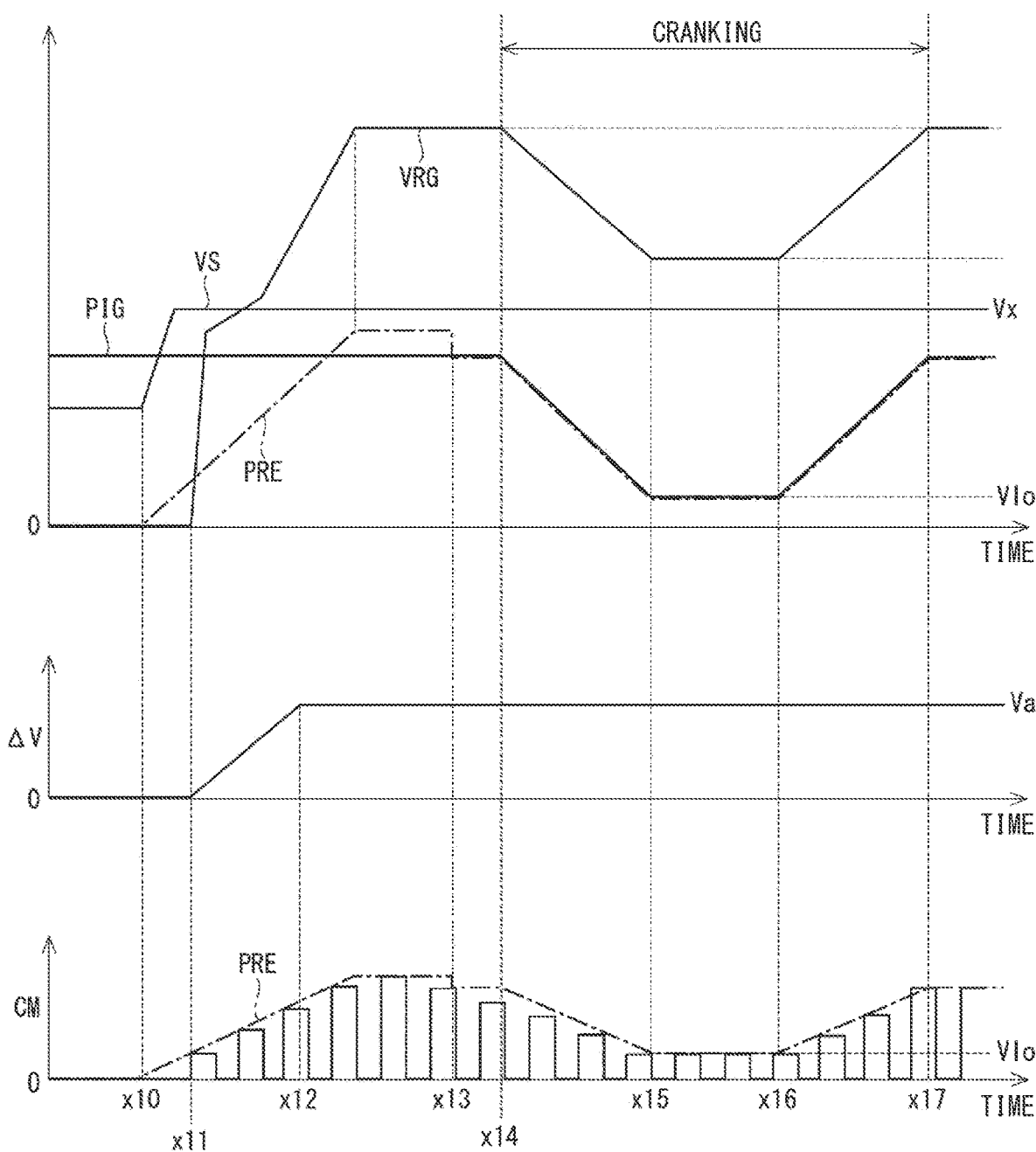
FIG. 5 is a time chart illustrating a change in voltage at the time of starting according to the first embodiment.

FIG. 5 is a time chart illustrating a change in voltage when the vehicle start switch is turned on. In FIG. 5, various voltages are shown in the upper stage, the difference voltage ΔV (=VRG−PRE) is shown in the middle stage, and the driver output voltage CM (see FIG. 4) and the pre-charge voltage PRE of the charge pump driver circuit 31 are shown in the lower stage. PIG in the drawing is the voltage of the battery 90.

When the start switch is turned on at time ×10, the booster circuit 10 is boosted and driven. Further, the pre-charge circuit 20 is driven to pre-charge the smoothing capacitor 69. When the charge pump circuit 30 is driven at time ×11, the charge pump voltage VRG rises, and at time ×12, the difference voltage ΔV stabilizes at a predetermined value Va (for example, 16 [V]). When the power supply relay unit 63 is turned on at time ×13, the pre-charge voltage PRE and the battery voltage PIG match.

When cranking is started at time ×14, the pre-charge voltage PRE decreases as the battery voltage PIG decreases. In the present embodiment, since the power supply of the charge pump driver circuit 31 is provided by the pre-charge voltage PRE, the charge pump voltage VRG varies according to the pre-charge voltage PRE even if the charge pump circuit 30 is constantly driven. Therefore, the difference voltage ΔV, which is the difference between the charge pump voltage VRG and the pre-charge voltage PRE, is kept substantially constant.

Therefore, the gate-source voltage Vgs of the upper arm element 651 is kept substantially constant regardless of the change of the pre-charge voltage PRE even if the charge pump circuit 30 is continuously driven. As a result, when the pre-charge voltage PRE is lowered due to cranking or the like, intermittent operation for suppressing the gate-source voltage Vgs to be the withstand voltage or less becomes unnecessary, and the occurrence of sound noise can be prevented. Further, it is not necessary to separately provide a protection element such as a Zener diode, and the number of parts can be reduced.

The time ×14 to the time ×17 is a cranking period, and the battery voltage PIG, the pre-charge voltage PRE, and the charge pump voltage VRG decrease, reach the lower limit value Vlo at the time ×15, and increase from the time ×16. When the cranking is completed at time ×17, the battery voltage PIG stabilizes at the initial value (for example, 14 [V]).

As described above, the drive device 1 includes an inverter unit 65 and a charge pump circuit 30. The inverter unit 65 has an upper arm element 651 and a lower arm element 652, and converts the electric power to be supplied to the load. The charge pump circuit 30 supplies the gate voltage of the upper arm element 651. The charge pump voltage VRG, which is the output voltage of the charge pump circuit 30, is variable according to the inverter input voltage input from the inverter input wiring 601 to the high potential side of the inverter unit 65. The inverter input voltage of this embodiment is a pre-charge voltage PRE.

By setting the driver output voltage CM to be about the same as the inverter input voltage, the gate-source voltage Vgs of the upper arm element 651 can be suppressed to be equal to or less than the withstand voltage even when the battery voltage fluctuates due to cranking or the like, so that the upper arm element 651 can be appropriately protected.

The charge pump circuit 30 includes a charge pump driver circuit 31 having switching elements 317 and 318. The output of the charge pump driver circuit 31 is variable according to the inverter input voltage. In this embodiment, the high potential side of the driver switching element 317 is connected to the same potential as the inverter input wiring. Here, the same potential means the potential within a voltage difference due to wiring resistance or the like. Thereby, the charge pump voltage VRG can be made variable according to the inverter input voltage.

The drive device 1 further includes a booster circuit 10 that boosts the voltage of the battery 90 and supplies it to the charge pump circuit 30. As a result, even if the battery voltage drops, the gate-source voltage Vgs of the upper arm element 651 can be secured.

The drive device 1 includes a power supply relay unit 63 and a pre-charge circuit 20. The power supply relay unit 63 is provided in the inverter input wiring 601. The boost voltage VS of the booster circuit 10 can be supplied to the downstream side of the power supply relay unit 63. As a result, even if the power supply relay unit 63 is provided, the charge pump circuit 30 can be appropriately operated via the pre-charge circuit 20 until the power supply relay unit 63 is turned on.

The drive device 1 includes a voltage monitor circuit 50 that monitors the difference between the charge pump voltage VRG and the inverter input voltage. As a result, even when a failure occurs in which the boost voltage VS rises, the gate-source voltage Vgs of the upper arm element 651 can be set to the withstand voltage or less.

Second Embodiment

Figure 6:
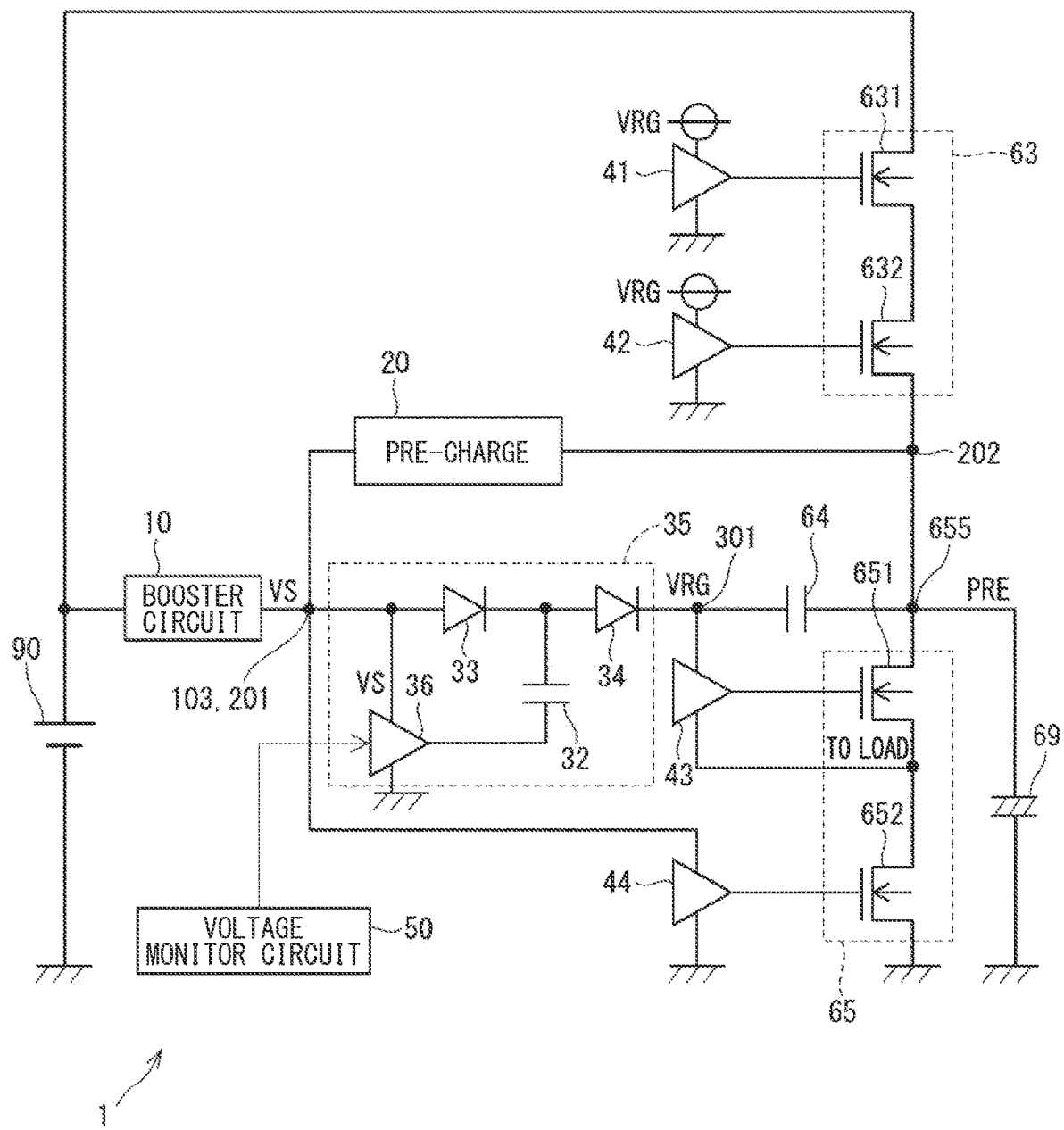
FIG. 6 is a circuit diagram showing a drive device according to a second embodiment.

A second embodiment will be described based on FIGS. 6 and 7. In the charge pump circuit 35 of the present embodiment, the charge pump driver circuit 36 is different from the above embodiment. In the present embodiment, the charge pump driver circuit 36 is supplied with a boost voltage VS as a power source, and the output is clamped in the vicinity of the pre-charge voltage PRE.

Figure 7:
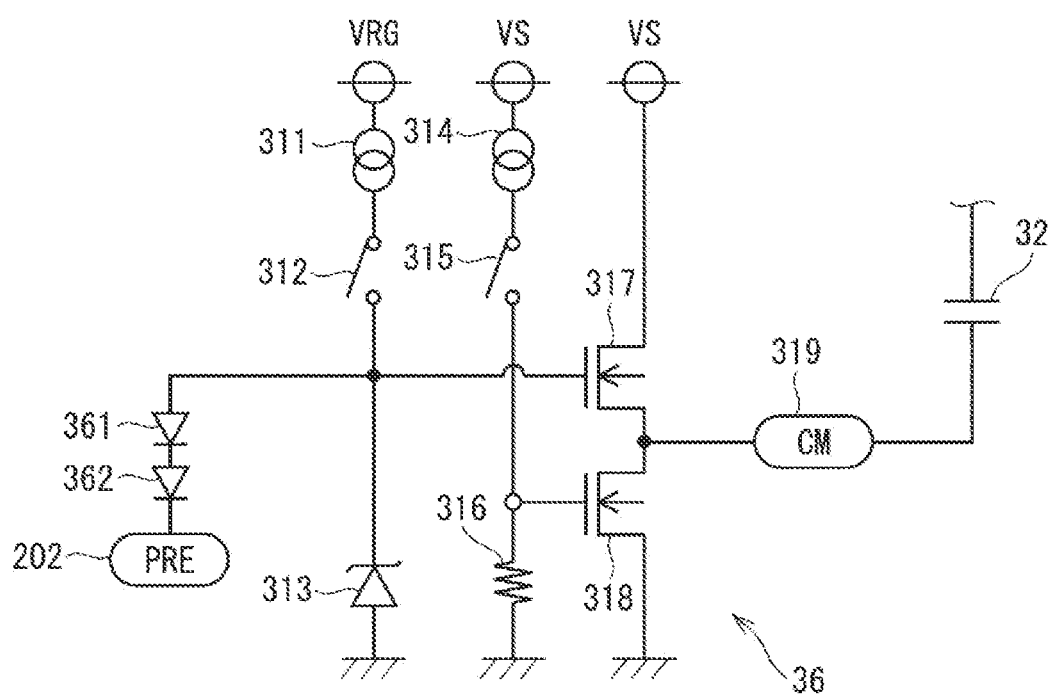
FIG. 7 is a circuit diagram showing a charge pump driver circuit according to the second embodiment.

The charge pump driver circuit 36 of this embodiment is shown in FIG. 7. In the charge pump driver circuit 36, the gate of the switching element 317 is connected to the pre-charge terminal 202 of the pre-charge circuit 20 via the diodes 361 and 362. The diodes 361 and 362 are connected in series so that the anode is disposed on the gate side of the switching element 317 and the cathode is disposed on the pre-charge terminal 202 side. By connecting the gate of the switching element 317 and the pre-charge terminal 202 via the diodes 361 and 362, when the pre-charge voltage PRE decreases, the gate voltage of the switching element 317 decreases and the driver output voltage CM decreases.

For example, the boost voltage VS=16 [V] and the charge pump voltage VRG=30 [V]. When the pre-charge voltage PRE is 16 [V], no current flows from the gate of the switching element 317 to the pre-charge terminal 202 side. Here, assuming that Vt is the source-gate voltage (=1 [V]) of the switching element 317, the gate voltage Vg_cp is given by the equation (5), and the driver output voltage CM is equal to the boost voltage VS and the pre-charge voltage PRE.

$$Vg\_cp=VS+Vt=17[V] \quad (5)$$

On the other hand, when the pre-charge voltage PRE decreases, for example, when the pre-charge voltage PRE is 4 [V], a current flows from the gate of the switching element 317 to the pre-charge terminal 202 side, and the gate voltage Vg_cp of the switching element 317 decreases (See equation (6-1)). Further, the driver output voltage CM is given by the equation (6-2). In the equations, "2×Vf_cp" in the equation is a voltage drop (=2×1 [V]) of the diodes 361 and 362.

$$Vg\_cp=PRE+2\times Vf\_cp=6[V] \quad (6\text{-}1)$$

$$CM=Vg\_cp-Vt \quad (6\text{-}2)$$

That is, when the pre-charge voltage PRE decreases, the driver output voltage CM decreases according to the pre-charge voltage PRE, so that the gate-source voltage Vgs of the upper arm element 651 is kept substantially constant regardless of the pre-charge voltage PRE.

In the present embodiment, the gate of the switching element 317 on the high potential side is connected to the same potential as the inverter input wiring 601 via the diodes 361 and 362. Thereby, the charge pump voltage VRG can be made variable according to the inverter input voltage. The number of diodes may be adjusted according to the source-gate voltage Vt of the switching element 317. The second embodiment also provides the same advantage as the first embodiment.

In the embodiment, the switching elements 317 and 318 correspond to the "driver switching element", and the pre-charge voltage PRE corresponds to the "inverter input voltage".

Other Embodiments

In the above embodiment, the charge pump circuit has one stage. In another embodiment, the charge pump circuit may have two or more stages. When the number of stages is defined as N, the charge pump voltage may be set to about a value of (inverter input voltage)/N if the voltage drop in the diode is not taken into consideration.

In the above embodiment, the load is a motor and is applied to an electric power steering device. In other embodiments, the motor may be applied to an in-vehicle device other than an electric power steering device such as a brake, a blower, an electric power window, a wiper, or a device other than the in-vehicle device. Further, the load may be something other than the motor. The present disclosure is not limited to the above embodiments but various modifications may be made further within the scope of the present disclosure without departing from the spirit of the disclosure.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

What is claimed is:

1. A drive device for driving a load comprising:
   an inverter unit having an upper arm element and a lower arm element and converting electric power supplied to the load; and
   a charge pump circuit that supplies a gate voltage to the upper arm element, wherein:
   an output voltage of the charge pump circuit is variable according to an inverter input voltage input from an inverter input wiring to a high potential side of the inverter unit, and
   the drive device further comprising
   a booster circuit that boosts a voltage of a battery and supplies a boosted voltage to the charge pump circuit.

2. The drive device according to claim 1, wherein:
   the charge pump circuit includes a driver circuit having a driver switching element; and
   an output of the driver circuit is variable according to the inverter input voltage.

3. The drive device according to claim 2, wherein:
   a high potential side of the driver switching element is connected to the inverter input wiring.

4. The drive device according to claim 1, further comprising:
   a power supply relay unit connected to the inverter input wiring; and
   a pre-charge circuit that supplies a pre-charge voltage, based on the boosted voltage, to the inverter input wiring.

5. The drive device according to claim 1, further comprising:
   a voltage monitor circuit that monitors a difference between the output voltage of the charge pump circuit and the inverter input voltage.

6. A drive device for driving a load comprising:
   an inverter unit having an upper arm element and a lower arm element and converting electric power supplied to the load; and
   a charge pump circuit that supplies a gate voltage to the upper arm element,
   wherein:
   an output voltage of the charge pump circuit is variable according to an inverter input voltage input from an inverter input wiring to a high potential side of the inverter unit;
   the charge pump circuit includes a driver circuit having a driver switching element;
   an output of the driver circuit is variable according to the inverter input voltage; and
   a gate of the driver switching element on the high potential side is connected to the inverter input wiring via a diode.

* * * * *